(12) United States Patent
Clark et al.

(10) Patent No.: US 7,761,672 B2
(45) Date of Patent: Jul. 20, 2010

(54) DATA MOVEMENT AND INITIALIZATION AGGREGATION

(75) Inventors: Michael T. Clark, Austin, TX (US); Matthew Rafacz, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 404 days.

(21) Appl. No.: 11/770,333

(22) Filed: Jun. 28, 2007

(65) Prior Publication Data

US 2009/0006791 A1 Jan. 1, 2009

(51) Int. Cl.
*G06F 12/00* (2006.01)
(52) U.S. Cl. ...................................................... 711/162
(58) Field of Classification Search .................. 711/162
See application file for complete search history.

(56) References Cited

U.S. PATENT DOCUMENTS

| 5,752,015 | A | | 5/1998 | Henry et al. | |
|---|---|---|---|---|---|
| 5,911,151 | A | * | 6/1999 | Circello et al. | 711/201 |
| 5,926,642 | A | | 7/1999 | Favor | |
| 6,026,239 | A | * | 2/2000 | Patrick et al. | 717/154 |
| 2004/0098556 | A1 | | 5/2004 | Buxton et al. | |
| 2004/0128457 | A1 | * | 7/2004 | Maki | 711/162 |
| 2005/0144426 | A1 | * | 6/2005 | Col et al. | 712/241 |
| 2005/0188099 | A1 | * | 8/2005 | Patel | 709/236 |
| 2005/0216688 | A1 | * | 9/2005 | Watanabe | 711/165 |

OTHER PUBLICATIONS

International Search Report & Written Opinion mailed Nov. 14, 2008; International Application No. PCT/US2008/007961.

* cited by examiner

*Primary Examiner*—Matt Kim
*Assistant Examiner*—Hamdy S Ahmed
(74) *Attorney, Agent, or Firm*—Rory D. Rankin; Meyertons Hood Kivlin Kowert & Goetzel, P.C.

(57) ABSTRACT

A system and method for copying and initializing a block of memory. To copy several data entities from a source region of memory to a destination region of memory, an instruction may copy each data entity one at a time. If an aggregate condition is determined to be satisfied, multiple data entities may be copied simultaneously. The aggregate condition may rely on an aggregate data size, the size of the data entities to be copied, and the alignment of the source and destination addresses.

15 Claims, 4 Drawing Sheets

DATA MOVEMENT AND INITIALIZATION AGGREGATION

BACKGROUND OF THE INVENTION

1. Field of the Invention

This invention relates to computer systems, and more particularly, to copying and initializing a block of memory of the computer system.

2. Description of the Relevant Art

In computing systems, a physical move of data from one location of memory to another location of memory may better suit execution of application(s) or other aspects of system operation. Some reasons for performing such a relocation may include a change in resources such as failing hardware components, hot add/removal of hardware components where the components are added/removed while applications are running, and change in availability of hardware resources due to power management techniques. Also, optimizing load balances is another reason for wanting a relocation benefit.

When multiple data entities, such as a 1-byte, 2-byte, or 4-byte entity, needs to be relocated in memory, each entity must be moved with an instruction. The entire move may require several instructions. This may cause the execution of application(s) that need the data to slow down due to waiting for the several instructions of the data move to complete before the application(s) may continue.

The same situation may occur for data entities that may need to be initialized to a predetermined value such as zero. While each data entity is initialized by a single instruction, application(s) may need to wait and, therefore, performance suffers.

In view of the above, an efficient method for achieving copying and initializing a block of memory is desired.

SUMMARY OF THE INVENTION

Systems and methods for achieving efficient copying and initializing a block of memory are disclosed. In one embodiment, a method is provided to receive an instruction to copy a number N of data entities from a source location to a destination location. The copy may be made more efficient if an aggregate condition is satisfied that allows several blocks of the data entities to be copied simultaneously. For a simultaneous copy, the destination addresses of the data entities may need to be aligned to a predetermined boundary. If they are not, particular data entities may be copied one at a time as if the aggregate condition had not been satisfied. The copy may be used to move a block data from a source location to a destination location or to initialize a block of data at a destination location with a datum in a source location.

In another aspect of the invention, a computer system is provided comprising a processor and a memory. The processor may be configured to receive an instruction for copying a number N of data entities, wherein each entity may comprise D bytes, from a source location to a destination location. The source location may be an architectural register or a region of the memory. The destination location may be a region of the memory. The copy may be used to move a block data from a source location in the memory to a destination location in the memory. Alternatively, the copy may be used to initialize a block of data at a destination location in the memory with a datum in an architectural register in the processor. The copy may be made more efficient if an aggregate condition is satisfied that allows several blocks of the data entities to be copied simultaneously, rather than one data entity at a time. The memory may have a width, or an aggregate data size, of M bytes. Some needed requirements to satisfy the aggregate condition may include the aggregate data size, M, is less than or equal to the total size of the data entities to be copied and the initial destination address is aligned to the size of the data entity and to the initial source address.

In still another aspect of the invention, a single machine language instruction is provided that is configured to copy N data entities, wherein each entity may comprise D bytes, from a source location to a destination location. The instruction may perform the copy in an efficient manner by simultaneously copying a block of an aggregate data size, such as M bytes, of data entities, rather than copy each data entity one at a time.

Figure 1:
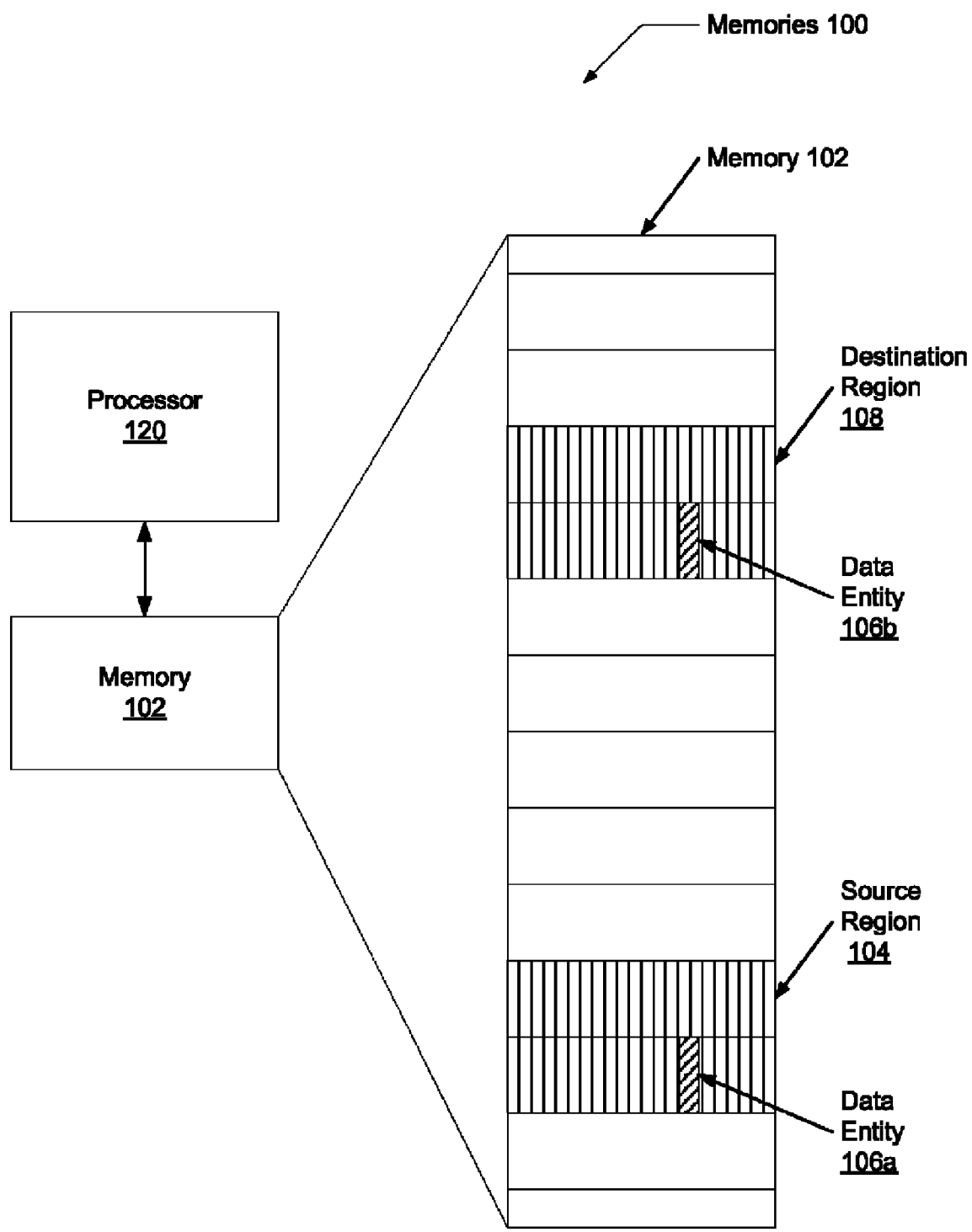
FIG. 1 is a generalized block diagram illustrating one embodiment of aligned source and destination regions of memory for a copy operation.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Referring to FIG. 1, one embodiment of a memory 100 with source and destination regions for a copy operation is shown. Memory 102 may be any memory such as a L1, L2, or L3 cache memory for a processor 120 or system memory such as RAM for a single processor 120 or a group of processors in a processing node of a network. Alternatively, memory 102 may be a hard disk in a computer system. Processor 120 may have one or more processing cores and one or more levels of cache memory. In a preferred embodiment, the width of memory 102 may be 64 bits, or 8-bytes, but the width may differ in other embodiments of the invention. The width may be referred to as an aggregate data size. Memory 102 has a source region 104 aligned to the width of memory 102. The entire source region 104 to be copied lies within the width of memory 102 without partial overlap into of other aggregate-sized regions. A data entity 106*a*-106*b* may comprise the smallest granularity of data in the source region 104. As used herein, elements referred to by a reference numeral followed by a letter may be collectively referred to by the numeral alone. For example, data entity 106*a*-106*b* may be collectively referred to as data entity 106. As shown, data entity 106 may have a data size less than or equal to the aggregate data size. For example, the aggregate data size may be 8 bytes as mentioned above and the data size may be 1-byte, 2-bytes, or 4-bytes depending on the embodiment.

A destination region 108 may be aligned to the width of memory 102. The entire destination region 108 that may receive copies lies within the width of memory 102 without partial overlap into of other aggregate-sized regions. Just like the source region 104, the destination region 108 may be comprised of a plurality of data entities 106. Furthermore, the destination region 108 is aligned with the source region 104. It is noted that while the term "copy" is used herein, it is to be understood that any operation which stores data identified by a source location to a destination is contemplated—whether or not the data in the source location is retained. Accordingly, the terms copy and move may be used interchangeably herein.

In order to perform a copy of each data entity 106 in the source region 104 to the destination region 108, each data entity 106 may be copied individually one-at-a-time. For example, if a data entity 106 has a data size of two bytes and the aggregate data size is eight bytes, memory 102 may need four individual copies per aggregate-sized block, or eight copies in total, to move the data from the source region 104 to the destination region 108. If the size of the source region 104 is large, the copy operation may require a significant amount of time. If memory 102 is part of a computer system executing applications, the performance of the system may suffer, since an application needing the copied data is required to wait a significant amount of time before continuing execution.

Alternatively, in the embodiment shown in FIG. 1, all the data entities 106 in an aggregate-sized block may be copied simultaneously from the source region 104 to the destination region 108, rather than each data entity 106 being copied individually. In FIG. 1, two aggregate-sized copies may be performed to complete the copy operation. In the above example with data entities of data size 2 bytes and a block having an aggregate data size of 8 bytes, only two copies, each of 8 bytes, is required to move data from the from the source region 104 to the destination region 108.

Figure 2:
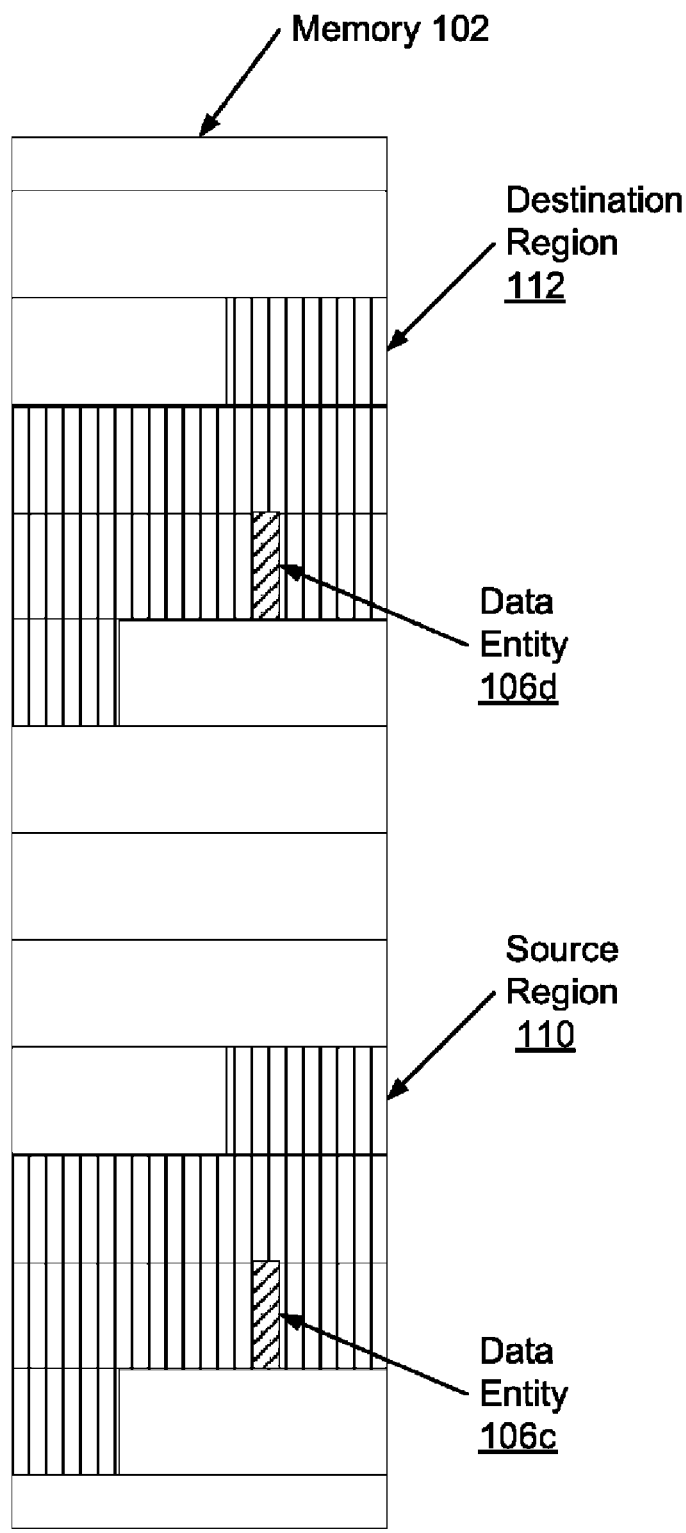
FIG. 2 is a generalized block diagram illustrating another embodiment of aligned source and destination regions of memory for a copy operation.

Turning now to FIG. 2, an alternative embodiment of a memory 100 with source and destination regions 110 and 112, respectively, for a copy operation is shown. Again, memory 102 may be a cache memory, RAM in a system memory, a hard disk, or other. The aggregate data size may be 8 bytes. The data size of a data entity 106 may be 2 bytes. The source region 110 is aligned to destination region 112. However, neither region is aligned to an aggregate-sized boundary as is found in FIG. 1. Both the initial and final data entities 106 of source region 110 partially fill an aggregate-sized block. In this case, the initial and final data entities 106 may need to be copied one-at-a-time, rather than simultaneously with an entire aggregate-sized block.

For example, the source region 110 may comprise 13 data entities 106, or 26 bytes, with two data entities 106 in the bottom block, four data entities 106 in each of the two filled blocks, and three data entities 106 in the top block. In order not to over-write data entities 106 outside the source region 110 and destination region 112, the bottom and top blocks containing data entities of the source region 110 may not be copied simultaneously to the destination region 112. Rather, the two data entities 106 in the bottom block of source region 110 may need to be copied individually one-at-a-time. Then the aggregate-sized block filled with four data entities 106, each of 2 bytes, for copying may be copied simultaneously. Likewise, the next 4 data entities 106 in the next aggregate-filled block may be copied simultaneously to the destination region 112. Finally, the three data entities 106 in the top block may be copied individually one-at-a-time to the destination region 112. The copy operation may require two 2-byte copies, two 8-byte copies, and three 2-byte copies. In this example, this may be a more efficient manner of moving data than performing thirteen 2-byte copies from the source region 110 to the destination region 112. The number of copies to perform in the former efficient manner may be characterized as follows.

The number P of data entities to copy prior to aggregate-sized simultaneous copies is:

$$P=\text{the integer quotient of } (M-K)/D;$$

where integer M is the aggregate data size, or 8 bytes in the above example, m is $\log_2 (M)-1$, or 2 in this example, and integer D is the data entity data size, or 2 bytes in this example, and K=the binary value represented by the least m significant bits [m:0] of the address. In this example, P=(8−4)/2=2 copies to perform.

The number A of aggregate-sized blocks to copy is:

$$A=((N-P)*D)/M.$$

In this example, A=((13−2)*2)/8=2 aggregate-sized copies, since A is an integer. Finally the number of remaining, or leftover, copies to perform after the aggregate-sized copies is:

$$L=(((N-P)*D)-(A*M))/D.$$

In this example, L=(((13−2)*2)−(2*8))/2=3 leftover copies.

Figure 3:
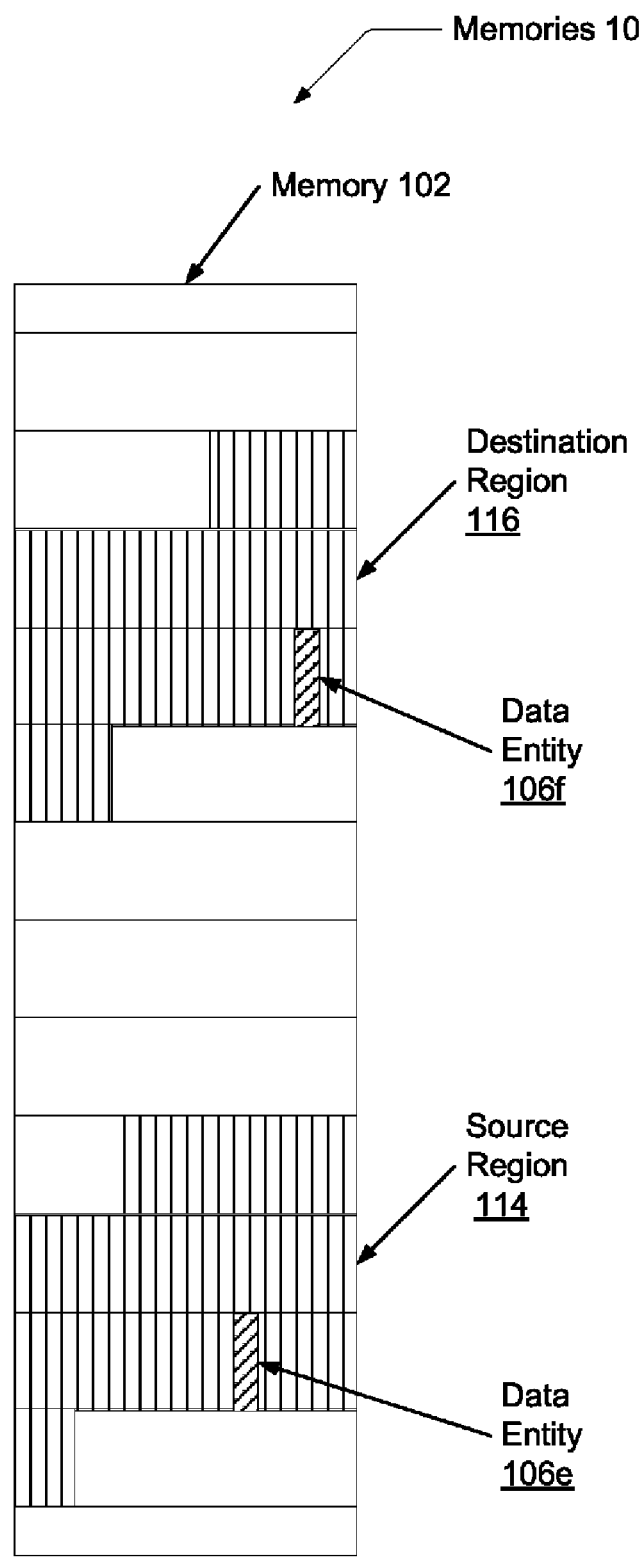
FIG. 3 is a generalized block diagram illustrating one embodiment of unaligned source and destination regions of memory for a copy operation.

FIG. 3 is a generalized block diagram illustrating another embodiment of a memory 100 with source and destination regions 114 and 116, respectively, for a copy operation. As above, memory 102 may be a cache memory, RAM in a system memory, a hard disk, or other. The aggregate data size may be 8 bytes. The data size of a data entity 106 may be 2 bytes. Neither the source nor the destination region, 114 or 116, is aligned to an aggregate-sized boundary as is found in FIG. 1. Both the initial and final data entities 106 of source region 114 partially fill an aggregate-sized block as in FIG. 2. However, here, the source region 114 is not aligned to destination region 116. In this case, the initial and final data entities 106 of the source region 114 may need to be copied one-at-a-time, rather than simultaneously with an entire aggregate-sized block, but also, the data entities 106 within the filled aggregate-sized blocks need to be copied one-at-a-time. No aggregate-sized simultaneous copies may be performed in this case.

For example, the source region 114 may comprise thirteen data entities 106, or twenty six bytes, with one data entity 106 in the bottom block, four data entities 106 in each filled aggregate-sized block, and four data entities 106 in the top block. However, the destination region 116 may have allocated space for twenty six bytes that includes two data entities 106 in its bottom block, four data entities 106 in each of its filled aggregate-sized blocks, and three data entities 106 in its top block. As mentioned above, the destination region 116 may not be aligned with the source region 114, as in this case. After the data entity 106 in the bottom block of the source region 114 is copied, the source region 114 is ready to simultaneously send a filled 8-byte block. However, the destination region 116 still has an empty data entity 106 in its bottom block and is not ready to have an 8-byte block written to it. Therefore, each of the thirteen data entities 106 in the source region 114 may need to be copied individually one-at-a-time and the previously discussed manner of efficiently copying data may not be used.

Alternatively, for FIGS. 1-3, rather than copy data from a source region in memory to a destination region in memory, contents of a register, such as an architectural register in a processor, may be used as a source. The contents of the register may be repeatedly copied to each data entity in the destination region, and thus, initializes the destination region. If the initial address of an initial data entity of the destination region is aligned with the data size, then aggregate-sized copies may be used to make the initialization process more efficient.

Figure 4:
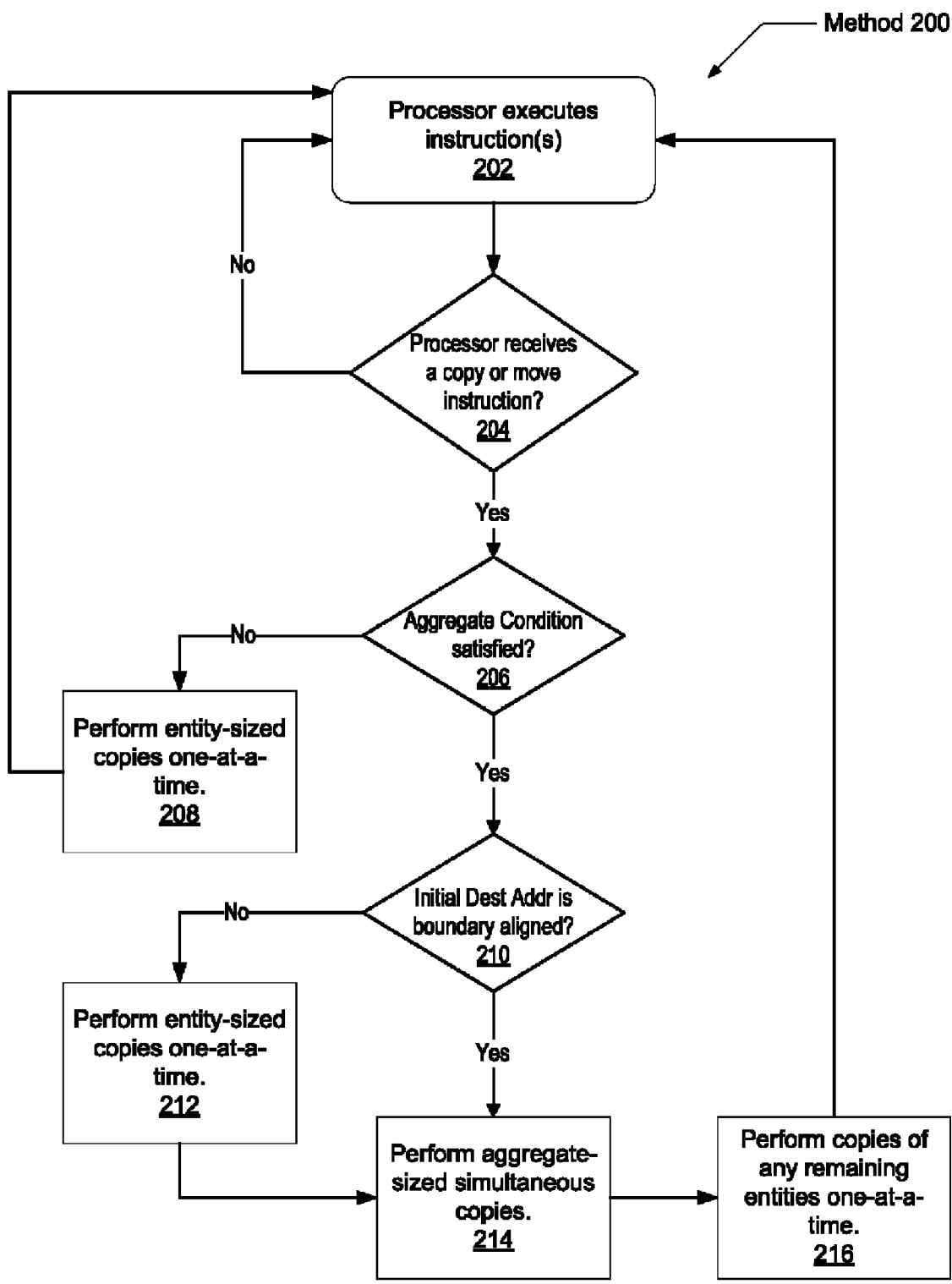
FIG. 4 is a flow diagram of one embodiment of a method for efficient copying of a block of memory.

FIG. 4 illustrates a method 200 for performing efficient copying of data to a memory. A processor is executing instructions of an application in block 202. The processor may receive an instruction to copy data for purposes of a data move or a data initialization (decision block 204). One particular copy instruction may have an opcode to indicate the type of instruction, which also indicates the data size, such as D bytes, of a single data entity. The opcode may infer that particular architectural registers hold the values to the initial addresses of the source and destination regions and a number N of data entities need to be written in a destination region. The memory that holds the destination region may have a width of M bytes. In one embodiment, the processor may execute instructions from an x86 instruction set architecture (ISA) and an instruction for a copy operation may be a REP MOVS instruction. For this instruction, the number N of data entities to copy is stored in the ECX register, the source address is stored in the DS:[ESI] register, and the destination address is stored in the ES:[EDI] register. For the x86 ISA, an initialization instruction may be the REP STOS instruction where the number N of data entities to write is stored in the ECX register and the contents to sue for initialization is stored in the AL, AX, or EAX register depending on the data size. In other embodiments, another ISA and/or instructions may be used.

If this particular instruction is received by the processor, an aggregate condition is checked (decision block 206) in order to determine if an efficient copy operation may be used. The aggregate condition may comprise having the aggregate data size, M bytes, is less than or equal to the number of data entities times the data size, or N*D bytes. Also, the initial destination address may need to be aligned to the data size. Finally, when both the initial source address and the initial destination address index a memory, the bits [m:0] of an initial source address may need to equate to bits [m:0] of the initial destination address, wherein m is $\log_2 (M)-1$. Furthermore, debug breakpoints and single step traps may be disabled to guarantee that traps are backward compatible.

If the aggregate condition is not satisfied, then the processor may perform the copy operation by copying each data entity individually one-at-a-time (block 208). Otherwise, an efficient manner may be used to perform the copy operation. However, before beginning this manner, there may be some data entities to be written in the destination region that are not aligned to the aggregate-sized block in memory (decision block 210). Therefore, these data entities may need to be copied individually one-at-a-time (block 212). Once these data entities are copied, the copy operation may simultaneously copy each data entity in a filled aggregate-sized block (block 214). Once this block is copied, another one that is filled may be copied and so forth. When all filled aggregate-sized blocks are copied to the destination region, afterwards, any remaining, or leftover, data entities may be copied to the destination region. These data entities may be copied individually one-at-a-time (block 216).

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for use in a processing device, the method comprising:

receiving a machine language instruction for a data copy operation from a source address to a destination address, wherein the instruction specifies a data size of D bytes for a data entity and a number N of data entities to copy;

determining whether an aggregate condition is satisfied, wherein the aggregate condition comprises:

an aggregate data size, M, which is less than or equal to the number of data entities N times the data size D;

the destination address is aligned to a data size D boundary; and bits m:0 of the source address are equal to bits m:0 of the destination address, wherein m is log2 (M)−1, and wherein m is not a most significant bit of either the source address or the destination address;

in response to determining an aggregate condition is not satisfied:

copying the N data entities from a source location to a destination location one data entity of D bytes at a time;

in response to determining an aggregate condition is satisfied:

copying the N data entities from the source location to the destination location, wherein at least some of the N data entities are copied in blocks of an aggregate data size of M bytes, wherein the processing device is capable of copying more than D bytes at a time.

2. The method as recited in claim 1, further comprising obtaining a source address for the source location and a destination address for the destination location.

3. The method as recited in claim 2, wherein in response to determining the aggregate condition is satisfied, the method further comprises: in response to determining the destination address is not aligned to an M-byte boundary, copying P data entities from the source location to the destination location one data entity at a time in units of a data size of D bytes, wherein P is equal to the integer quotient of (M−K)/D, where K=the binary value represented by an m least significant bits of the source address;

copying A data entities from the source location to the destination location in blocks of the aggregate data size of M bytes, wherein A is equivalent to ((N−P)*D)/M; and copying L data entities from the source location to the destination location one data entity at a time in units of a data size of D bytes, wherein L is equivalent to ((N−P)−(A*M))/D.

4. The method as recited in claim 3, wherein M mod D is zero.

5. The method as recited in claim 4, wherein the source location may be a memory or an architectural register set, and the destination location is a memory.

6. The method as recited in claim 5, wherein the instruction is either a REP MOVS instruction or a REP STOS instruction from the x86 instruction set architecture.

7. A computer system comprising:

a processor; and a memory;

wherein the processor is configured to:

receive a machine language instruction for a data copy operation from a source address to a destination address, wherein the instruction specifies a data size of D bytes for a data entity and a number N of data entities to copy;

determine whether an aggregate condition is satisfied, wherein the aggregate condition comprises:

an aggregate data size, M, which is less than or equal to the number of data entities N times the data size D;

the destination address is aligned to a data size D boundary; and bits m:0 of the source address are equal to bits m:0 of the destination address, wherein m is log2 (M)−1, and wherein m is not a most significant bit of either the source address or the destination address;

in response to determining an aggregate condition is not satisfied:
   copy the N data entities from a source location to a destination location one data entity of D bytes at a time;

in response to determining an aggregate condition is satisfied:
   copy the N data entities from the source location to the destination location, wherein at least some of the N data entities are copied in blocks of an aggregate data size of M bytes, wherein the processor is capable of copying more than D bytes at a time.

8. The system as recited in claim 7, wherein the processor is configured to obtain a source address for the source location and a destination address for the destination location.

9. The system as recited in claim 8, wherein in response to determining the aggregate condition is satisfied, the processor is further configured to:
   in response to determining the destination address is not aligned to an M-byte boundary, copy P data entities from the source location to the destination location one data entity at a time in units of a data size of D bytes, wherein P is equal to the integer quotient of (M−K)/D, where K=the binary value represented by an m least significant bits of the source address;
   copy A data entities from the source location to the destination location in blocks of the aggregate data size of M bytes, wherein A is equivalent to ((N−P)*D)/M; and
   copy L data entities from the source location to the destination location one data entity at a time in units of a data size of D bytes, wherein L is equivalent to ((N−P)−(A*M))/D.

10. The system as recited in claim 9, wherein M mod D is zero.

11. The system as recited in claim 10, wherein the source location may be the memory or an architectural register set within the processor, and the destination location is the memory.

12. The system as recited in claim 11, wherein the instruction is either a REP MOVS instruction or a REP STOS instruction from the x86 instruction set architecture.

13. A computer readable storage medium comprising program instructions executable by a processing device, wherein said instructions are executable to: receive a first instruction for a data copy operation from a source address to a destination address, wherein the first instruction is a machine language instruction that specifies a data size of D bytes for a data entity and a number N of data entities to copy;
   determine whether an aggregate condition is satisfied, wherein the aggregate condition comprises:
      an aggregate data size, M, which is less than or equal to the number of data entities N times the data size D;
      the destination address is aligned to a data size D boundary; and
      bits m:0 of the source address are equal to bits m:0 of the destination address, wherein m is log2 (M)−1, and wherein m is not a most significant bit of either the source address or the destination address; in response to determining an aggregate condition is not satisfied:
   copy the N data entities from a source location to a destination location one data entity of D bytes at a time;
   in response to determining an aggregate condition is satisfied:
      copy the N data entities from the source location to the destination location, wherein at least some of the N data entities are copied in blocks of an aggregate data size of M bytes, wherein the processing device is capable of copying more than D bytes at a time.

14. The medium as recited in claim 13, wherein the program instructions are further executable: access a first register holding an initial source address;
   access a second register holding an initial destination address;
   access a third register holding a number N of data entities to copy.

15. The medium as recited in claim 14, wherein in response to the aggregate condition being satisfied, the program instructions are further executable to: in response to determining the destination address is not aligned to an M-byte boundary, copying P data entities from the source location to the destination location one data entity at a time in units of a data size of D bytes, wherein P is equal to the integer quotient of (M−K)/D, where K=the binary value represented by an m least significant bits of the source address;
   copying A data entities from the source location to the destination location in blocks of the aggregate data size of M bytes, wherein A is equivalent to ((N−P)*D)/M; and
   copying L data entities from the source location to the destination location one data entity at a time in units of a data size of D bytes, wherein L is equivalent to ((N−P)−(A*M))/D.

* * * * *